US011320909B2

(12) United States Patent
Gomi

(10) Patent No.: US 11,320,909 B2
(45) Date of Patent: May 3, 2022

(54) PSEUDO-HAPTIC DEVICE

(71) Applicant: NIPPON TELEGRAPH AND TELEPHONE CORPORATION, Tokyo (JP)

(72) Inventor: Hiroaki Gomi, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/046,655

(22) PCT Filed: Apr. 3, 2019

(86) PCT No.: PCT/JP2019/014746
§ 371 (c)(1),
(2) Date: Oct. 9, 2020

(87) PCT Pub. No.: WO2019/198583
PCT Pub. Date: Oct. 17, 2019

(65) Prior Publication Data
US 2021/0157409 A1    May 27, 2021

(30) Foreign Application Priority Data

Apr. 12, 2018   (JP) .............................. JP2018-077091

(51) Int. Cl.
*G06F 3/041*   (2006.01)
*G06F 3/01*    (2006.01)

(52) U.S. Cl.
CPC ................................. *G06F 3/016* (2013.01)

(58) Field of Classification Search
CPC .................................................. H04B 1/3888
See application file for complete search history.

(56) References Cited

U.S. PATENT DOCUMENTS

2002/0149561 A1* 10/2002 Fukumoto .......... G01C 21/3664
                                                    345/156
2013/0184077 A1   7/2013 Galpern
2014/0354570 A1* 12/2014 Makinen ............. G06F 3/04886
                                                    345/173
2018/0369865 A1  12/2018 Shoji et al.

FOREIGN PATENT DOCUMENTS

| JP | 2015225521 A | 12/2015 |
| JP | 2017757 A | 1/2017 |
| JP | 6126047 B2 | 4/2017 |
| WO | 2017115729 A1 | 7/2017 |
| WO | 2017183537 A1 | 10/2017 |

* cited by examiner

*Primary Examiner* — Carl Adams

(57) ABSTRACT

Provided is a mock force sensation presenting device that is easily integrated with information equipment and has more degrees of freedom with respect to the directions in which mock force sensation presenting is provided. A mock force sensation presenting device including: a case; a holder formed on a backside of the case; a plurality of mock force sensation presenting modules contained in the holder, the mock force sensation presenting modules being able to provide mock force sensation presenting at least in a positive direction and a negative direction of predetermined two axes; and an information device contained in the case and communicably connected to the mock force sensation presenting modules, the information device including a control unit that controls the mock force sensation presenting modules.

21 Claims, 9 Drawing Sheets

PSEUDO-HAPTIC DEVICE

CROSS-REFERENCE TO RELATED APPLICATIONS

This application is a U.S. 371 application of International Patent Application No. PCT/JP2019/014746, filed on 3 Apr. 2019, which application claims priority to and the benefit of JP Application No. 2018-077091, filed on 12 Apr. 2018, the disclosures of which are hereby incorporated herein by reference in their entireties.

TECHNICAL FIELD

The present invention relates to a mock force sensation presenting device that presents mock force sensation to a user.

BACKGROUND ART

Conventional technologies for a device that presents mock force sensation to a user include, for example, those disclosed in PTL 1 and PTL 2.

CITATION LIST

Patent Literature

[PTL 1] Japan Patent No. 6126047
[PTL 2] WO 2017/183537

SUMMARY OF THE INVENTION

Technical Problem

Application of the conventional technologies to a smartphone, a tablet, or other information device will have the following problems.

A smartphone, a tablet, or other information device often includes a vibration device for providing tactile stimulation. However, the principle of the vibration device cannot present directional force sensation.

An attempt has been made to integrate a mock force sensation presenting device and a smartphone or other information device. It is necessary to develop a mock force sensation presenting device dedicated to each information device. Therefore, use of a mock force sensation presenting device in combination with a variety of devices will require a lot of development cost and time.

In addition, when integrating a mock force sensation presenting device with a smartphone of a tablet or the like, it is difficult in some cases to clearly present mock force sensation only by attaching the device to the smartphone or the like.

Although the degree of freedom and direction of the required mock force sensation presentation may change depending on the application's nature and the purpose of the mock force sensation presentation, it is difficult to change the freedom and direction accordingly in a dedicated device.

Accordingly, it is an object of the present invention to provide a mock force sensation presenting device that is easily integrated with information equipment and has more degrees of freedom with respect to the directions in which mock force sensation is presented.

Means for Solving the Problem

A mock force sensation presenting device according to the present invention includes a case; a holder formed on a backside of the case; a plurality of mock force sensation presenting modules contained in the holder, the mock force sensation presenting modules being able to present mock force sensation at least in a positive direction and a negative direction of predetermined two axes; and an information device contained in the case and communicably connected to the mock force sensation presenting modules, the information device including a control unit that controls the mock force sensation presenting modules.

Effects of the Invention

A mock force sensation presenting device according to the present invention may be easily integrated with information equipment and have more degrees of freedom with respect to the directions in which mock force sensation is presented.

BRIEF DESCRIPTION OF DRAWINGS

FIG. 1(a) is a transparent plan view, FIG. 1(b) is a transparent front view, and FIG. 1(c) is a transparent left side view.

FIG. 4(a) is a plan view, FIG. 4(b) is a front view, and FIG. 4(c) is a bottom view.

FIG. 6(a) shows mock force sensation presentation in x+/x− direction translations, FIG. 6(b) shows mock force sensation presentation in y+/y− direction translations, and FIG. 6(c) shows mock force sensation presentation in clockwise rotation/counter-clockwise rotation.

FIG. 8(a) shows mock force sensation presentation in x+/x− direction translations, FIG. 8(b) shows mock force sensation presentation in y+/y− direction translations, and FIG. 8(c) shows mock force sensation presentation in clockwise rotation/counter-clockwise rotation.

DESCRIPTION OF EMBODIMENTS

Figure 1:
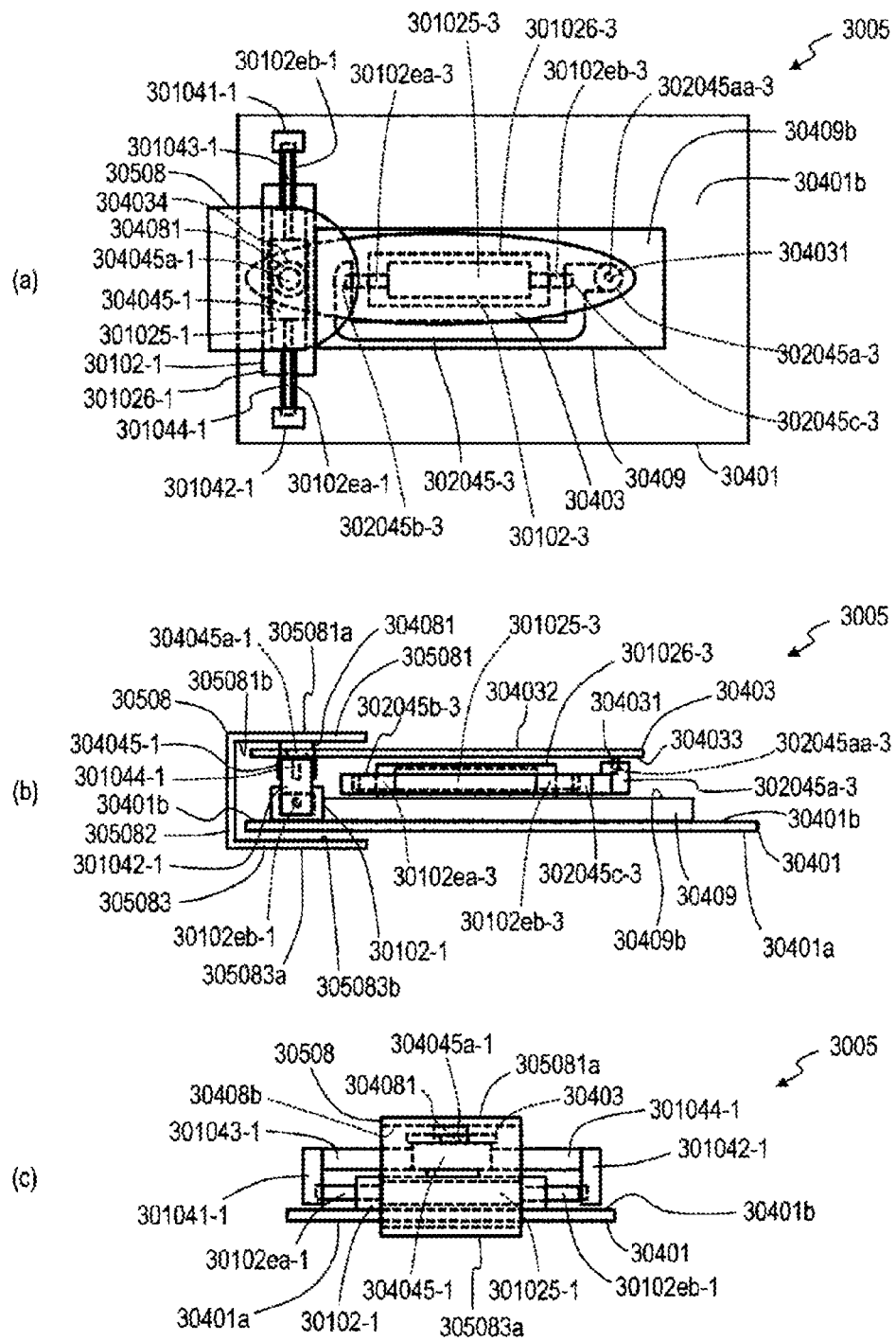
FIG. 1 illustrates a configuration of a mock force sensation generation device according to a twentieth embodiment in PTL 2.

Embodiments of the present invention will be described in more detail below. Note that components having like functions are referred to by like reference numerals and repeated description thereof is omitted here.

First, a twentieth embodiment in PTL 2 will be described below as a conventional technology describing a structure and a principle of a mock force sensation presenting module 14 that appears in embodiments described below.

Twentieth Embodiment in PTL 2

A description is given below of a configuration of a mock force sensation generation device 3005 according to the twentieth embodiment in PTL 2 with reference to FIG. 1(a) to FIG. 1(c) and FIG. 2. As illustrated in FIG. 1(a) to FIG. 1(c) and FIG. 2, the mock force sensation generation device 3005 in this embodiment includes a base 30401, a vibrator 30102-$i$ (note, i=1, 3), plate spring parts 301043-1 and 301044-1, coupling parts 301041-1 and 301042-1, a fixing part 304045-1, a coupling part 302045-3, a seat 30409, a connection 30403, and a contacting part 30508. The vibrator 30102-$i$ (note, i=1, 3) includes a support part 301026-$i$, a movable part 301025-$i$, a coupling part 30102ea-$i$, and a coupling part 30102eb-$i$.

The contacting part 30508 is a rigid body or a member considered as a rigid body. The contacting part 30508 includes a first region 305081 disposed on a first side 30401$b$ of the base 30401 (a first side of a base mechanism), a second region 305082 supported at a first end of the first region 305081, and a third region 305083 supported at a second end of the second region 305082, the third region 305083 being disposed on a second side 30401$a$ of the base 30401 (a second side of the base mechanism). The first region 305081, the second region 305082, and the third region 305083 may or may not be integrated. Each of the first region 305081, the second region 305082, and the third region 305083 has a generally plate shape. In this embodiment, a generally plate-shaped part of the first region 305081 and a generally plate-shaped part of the third region 305083 are disposed in generally parallel. A generally plate-shaped part of the second region 305082 is generally perpendicular to them. However, the generally plate-shaped part of the first region 305081 and the generally plate-shaped part of the third region 305083 may not be in generally parallel. In addition, the generally plate-shaped part of the first region 305081 and the generally plate-shaped part of the third region 305083 may not be generally perpendicular to the generally plate-shaped part of the second region 305082. At least any of the first region 305081, the second region 305082, and the third region 305083 may include a curved and generally plate-shaped part. A cylindrical protrusion 304081 is centered on a first plate surface 305081$b$ of the first region 305081. As described above, the connection 30403 is disposed with a plate surface 304033 thereof facing a plate surface 30409$b$ of the seat 30409. The connection 30403 has a rotating shaft 304031 rotatable supported in an insertion hole 302045$aa$-3. A protrusion 304045$a$-1 of the fixing part 304045-1 is inserted from the plate surface 304033 into a through-hole 304034 of the connection 30403. The cylindrical protrusion 304081 of the contacting part 30508 is inserted from a plate surface 304032 into the through-hole 304034 of the connection 30403. In addition, the protrusion 304045$a$-1 through the through-hole 304034 is inserted and fixed in an inner wall surface of the cylindrical protrusion 304081. The first region 305081 is thus supported at the fixing part 304045-1 (a part of a first plate spring mechanism). In addition, between the first region 305081 and the third region 305083, disposed are at least a portion of a mechanism (base mechanism) including the seat 30409 and the support parts 301026-1 and 301026-3, at least a portion of a mechanism (first movable mechanism) including the movable part 301025-1 and the coupling parts 30102ea-1, 30102eb-1, 301041-1, and 301042-1, and at least a portion of a mechanism (first plate spring mechanism) including the plate spring parts 301043-1 and 301044-1 and the fixing part 304045-1.

Figure 2:
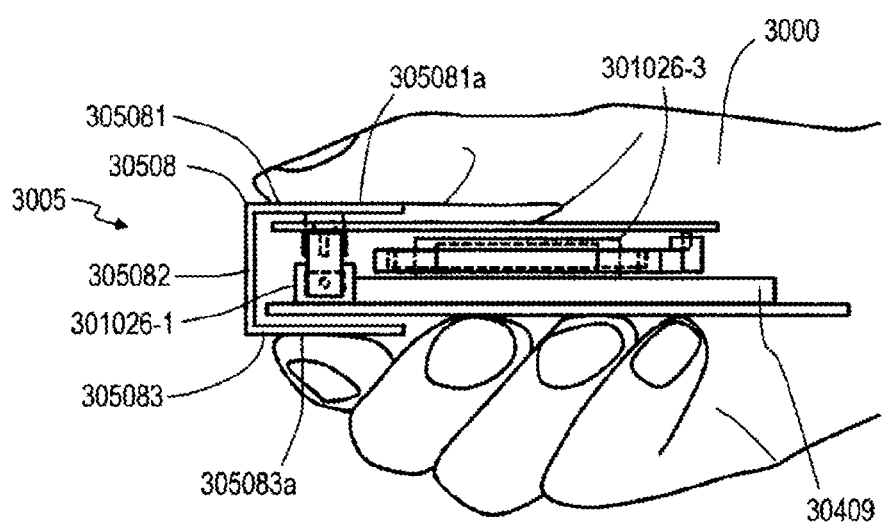
FIG. 2 is a schematic diagram for describing use state of the mock force sensation generation device according to the twentieth embodiment in PTL 2.

As illustrated in FIG. 2, a user supports the mechanism (base mechanism) including the seat 30409 and the support parts 301026-1 and 301026-3 on a palm 3000 and grips the contacting part 30508 to sandwich an outer plate surface 305081$a$ of the first region 305081 and an outer plate surface 305083$a$ of the third region 305083. Here, if the device is supported by gripping to sandwich the plate surface 305081$a$ and the plate surface 305083$a$, a user may not support the mechanism (base mechanism) on the palm 3000. Then, when the mock force sensation generation device 3005 is driven to asymmetrically move the contacting part 30508, a user may perceive force sensation based on the asymmetrical motion. When, as in this embodiment, a user grips the contacting part 30508 to sandwich the first region 305081 and the third region 305083, at least a portion of the force perpendicular to a plane, which force is presented from a user's thumb to the first region 305081, is presented via the second region 305082 to the third region 305083. The third region 305083 is supported by the user's index finger. This may limit that the force perpendicular to a plane provided to the first region 305081 by the user is added to the vibrators 30102-1 and 3 via the 30102eb-1, so that the burden on the vibrators 30102-1 and 3 may be reduced. This may reduce the wear of the vibrators 30102-1 and 3 and limit the prevention of the motion of the vibrators 30102-1 and 3, reducing the failure rate and efficiently presenting force sensation to the user.

First Embodiment

Figure 3:
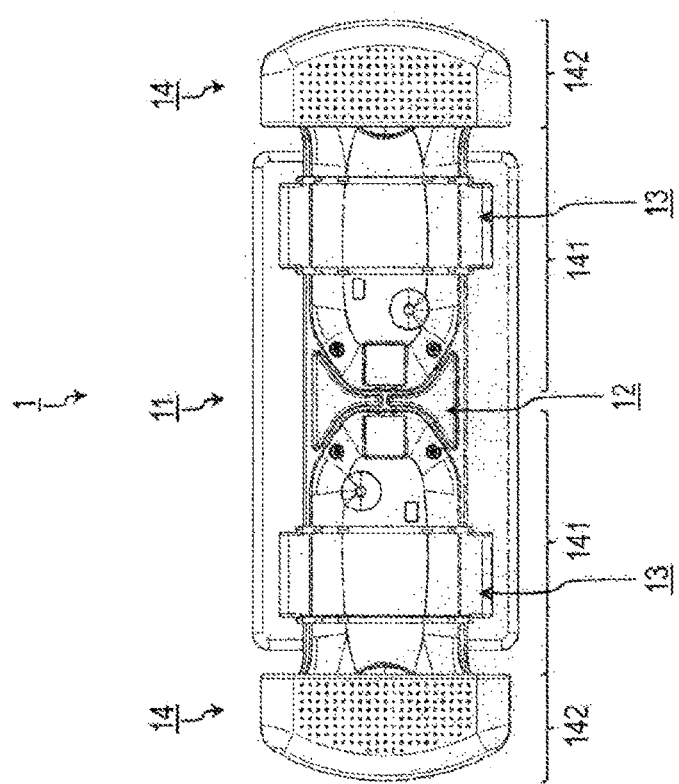
FIG. 3 is a bottom view illustrating a configuration of a mock force sensation presenting device in the first embodiment.
Figure 4:
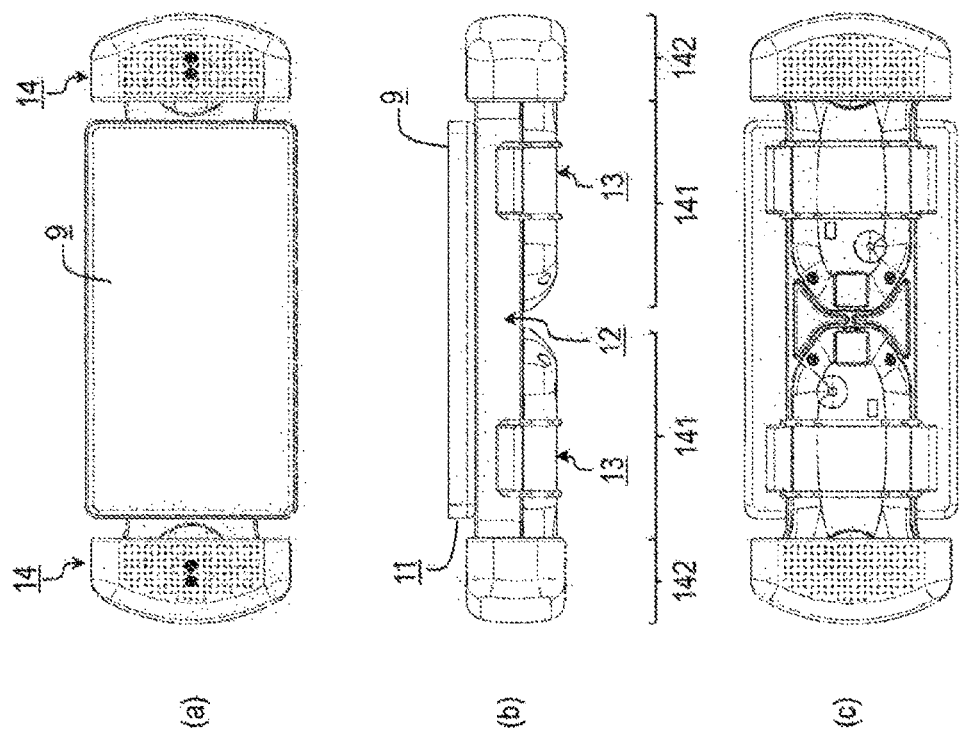
FIG. 4 illustrates a configuration of the mock force sensation presenting device in the first embodiment.

A mock force sensation presenting device 1 in the first embodiment of the present invention will be described below with reference to FIG. 3 and FIG. 4. As shown in FIG. 3 and FIG. 4, the mock force sensation presenting device 1 in this embodiment is configured to include a case 11, a holder 12, a belt 13, mock force sensation presenting modules 14 (two), and a smartphone 9 contained in the case 11. The case 11 has a thin rectangular tray shape that may contain a smartphone or the like. The holder 12 is formed so that it may contain the two mock force sensation presenting modules 14 as described below in 180 degrees different directions on the backside of the case 11. The belt 13 fixes the two mock force sensation presenting modules 14 to the case 11. The mock force sensation presenting modules 14 operate on the same principle as the mock force sensation generation device 3005. Each mock force sensation presenting module 14 includes a body 141 including therein a mechanism for presenting force sensation (the mechanism described in FIG. 1 and FIG. 2) and also includes a grip 142 formed on one side in a longitudinal direction of the mock force sensation presenting module 14, the grip 142 being to be gripped by a finger. The grip 142 is preferably made of light material so that it is lighter than the total weight of the information device such as the smartphone 9 and the body 141. Both longitudinal directions of the two respective mock force sensation presenting modules 14 are disposed in the longitudinal direction of the case 11 in 180 degrees different directions and fixed to the case 11. More particularly, the two mock force sensation presenting modules 14 are fixed to the case 11 in 180 degrees different directions so that one side on which the grip 142 is formed is positioned outside the case 11 in the longitudinal direction and the other side is positioned inside the case 11 in the longitudinal direction. In so doing, the case 11 and the two mock force sensation presenting modules 14 are fixed so that the grips 142 project outward from the longitudinal direction edge of the case 11. Note that the mock force sensation presenting modules 14 are communicably connected to the information device such as the smartphone 9 contained in the case 11. The communication may be wireless or wired. The asymmetric vibration of the mock force sensation presenting module 14 is controlled by a control unit (not shown) of the information device such as the smartphone 9 contained in the case 11. The control unit specifically corresponds to a CPU or memory or the like in operating a dedicated application installed in the information device such as the smartphone 9. The control unit instructs actuators of the mock force sensation presenting modules 14 to drive. This may allow for asymmetric vibration control of a plurality of the mock force sensation presenting modules 14 in a highly synchronized manner. Note that the mock force sensation presenting modules 14 may be used alone after detached from the case 11.

Figure 5:
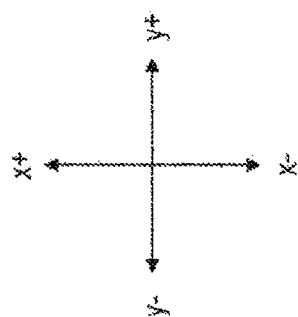
FIG. 5 is a schematic diagram showing directions in which each mock force sensation presenting module presents mock force sensation.
Figure 5:
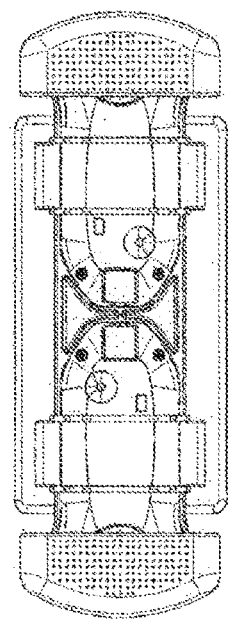
Figure 5:
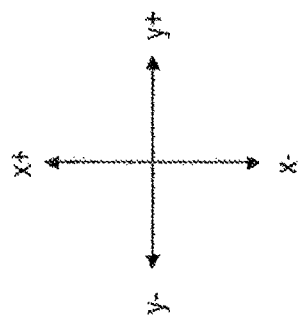

A description is given below of the degree of freedom in which each mock force sensation presenting module 14 presents mock force sensation with reference to FIG. 5. It is supposed in this embodiment that each mock force sensation presenting module 14 may present mock force sensation in the x axis shown in FIG. 5 (the x+ direction and the x− direction corresponding to the opposite direction of the x+ direction) and the y-axis (the y+ direction and the y− direction corresponding to the opposite direction of the y+ direction) perpendicular to the x-axis. With respect to the case 11, the x-axis direction corresponds to the lateral direction of the case 11 and the y-axis direction corresponds to the longitudinal direction of the case 11.

Figure 6:
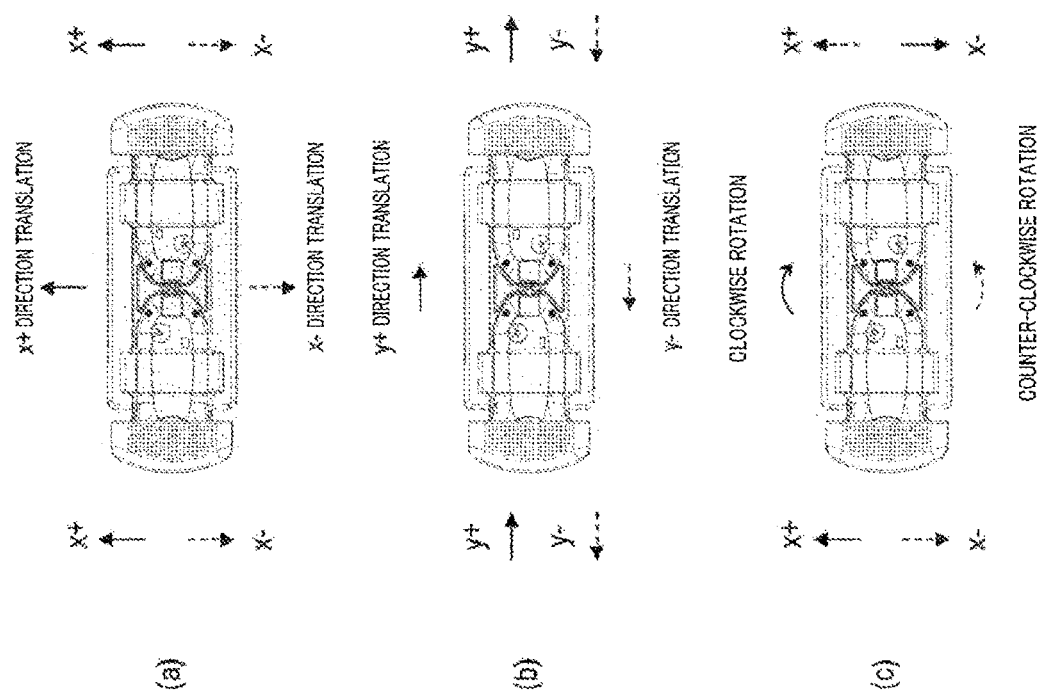
FIG. 6 is a schematic diagram showing variation of directions in which the mock force sensation presenting device in the first embodiment may present mock force sensation.

Next, a description is given of variation of the mock force sensation that may be presented by combination of the two mock force sensation presenting modules 14, with reference to FIG. 6. First, as shown in FIG. 6(a), when both of the two mock force sensation presenting modules 14 present mock force sensation in the x+ direction, the mock force sensation presenting device 1 may present, as a whole, mock force sensation that translates in the x+ direction. Likewise, when both of the two mock force sensation presenting modules 14 present mock force sensation in the x− direction, the mock force sensation presenting device 1 may present, as a whole, mock force sensation that translates in the x− direction. Likewise, as shown in FIG. 6(b), when both of the two mock force sensation presenting modules 14 present mock force sensation in the y+ or y− direction, the mock force sensation presenting device 1 may present, as a whole, mock force sensation that translates in the y+ or y− direction. Additionally, as shown in FIG. 6(c), when the left side mock force sensation presenting module 14 presents mock force sensation in the x+ direction, while the right side mock force sensation presenting module 14 presents mock force sensation in the x− direction, the mock force sensation presenting device 1 may present mock force sensation that rotates clockwise. Note, however, that FIG. 6(c) is viewed from the backside of the case 11, so when viewed from a user operating the information device such as a smartphone, it presents mock force sensation that rotates counter-clockwise. Likewise, when the left side mock force sensation presenting module 14 presents mock force sensation in the x− direction, while the right side mock force sensation presenting module 14 presents mock force sensation in the x+ direction, the mock force sensation presenting device 1 may present mock force sensation that rotates counter-clockwise (clockwise when viewed from the user operating the information device).

The mock force sensation presenting device 1 of the above configuration in this embodiment may thus be easily integrated with information equipment (for example, a smartphone) and have more degrees of freedom with respect to the directions in which mock force sensation is presented.

Second Embodiment

Figure 7:
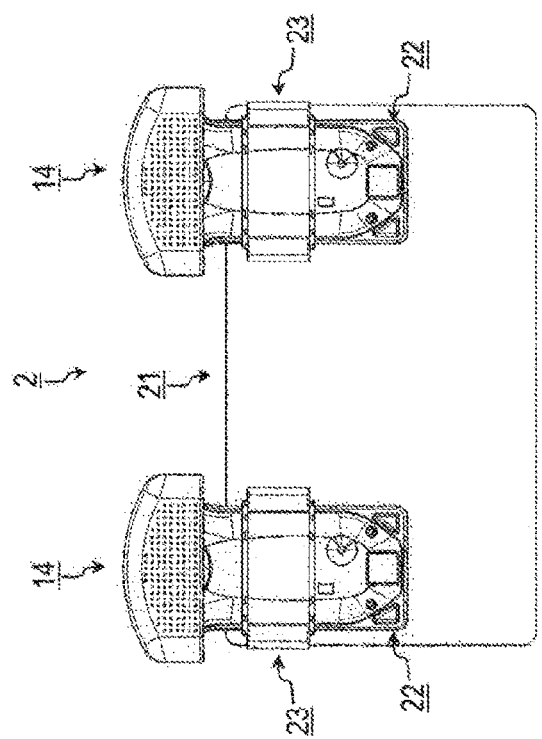
FIG. 7 is a bottom view illustrating a configuration of a mock force sensation presenting device in the second embodiment.

Next, a description is given of a mock force sensation presenting device in the second embodiment that may be integrated with a tablet terminal that is larger in size than a general smartphone or the like. A configuration of a mock force sensation presenting device 2 in this embodiment will be described below with reference to FIG. 7. As shown in FIG. 7, the mock force sensation presenting device 2 in this embodiment is configured to include a case 21, a holder 22, a belt 23, mock force sensation presenting modules 14 (two) similar to those in the first embodiment, a tablet terminal (not shown) contained in the case 21. The case 21 has a thin rectangular tray shape that may contain a tablet terminal or the like. The holder 22 is formed so that it may contain the two mock force sensation presenting modules 14 on the backside of the case 21 in the same direction. The belt 23 fixes the two mock force sensation presenting modules 14 to the case 21.

The two mock force sensation presenting modules 14 are fixed to the case 21 so that both their longitudinal directions are perpendicular to the longitudinal direction of the case 21. More particularly, the two mock force sensation presenting modules 14 are disposed in the same direction and fixed to the respective left and right ends in the longitudinal direction of the case 21 so that one side on which the grip 142 is formed is positioned outside the case 21 in the lateral direction and the other side is positioned inside the case 21 in the lateral direction. In so doing, the case 21 and the two mock force sensation presenting modules 14 are fixed so that the grip 142 projects outward (and upward) from the lateral direction edge (upper end portion) of the case 21. Note that the mock force sensation presenting modules 14 are communicably connected to the information device such as a tablet terminal contained in the case 21. The communication may be wireless or wired. The asymmetric vibration of the mock force sensation presenting module 14 is controlled by a control unit (not shown) of the information device such as a tablet terminal contained in the case 21. The control unit specifically corresponds to a CPU or memory or the like in operating a dedicated application installed in the information device such as the tablet terminal. The control unit instructs actuators of the mock force sensation presenting modules 14 to drive. This may allow for asymmetric vibration control of a plurality of the mock force sensation presenting modules in a highly synchronized manner.

Figure 8:
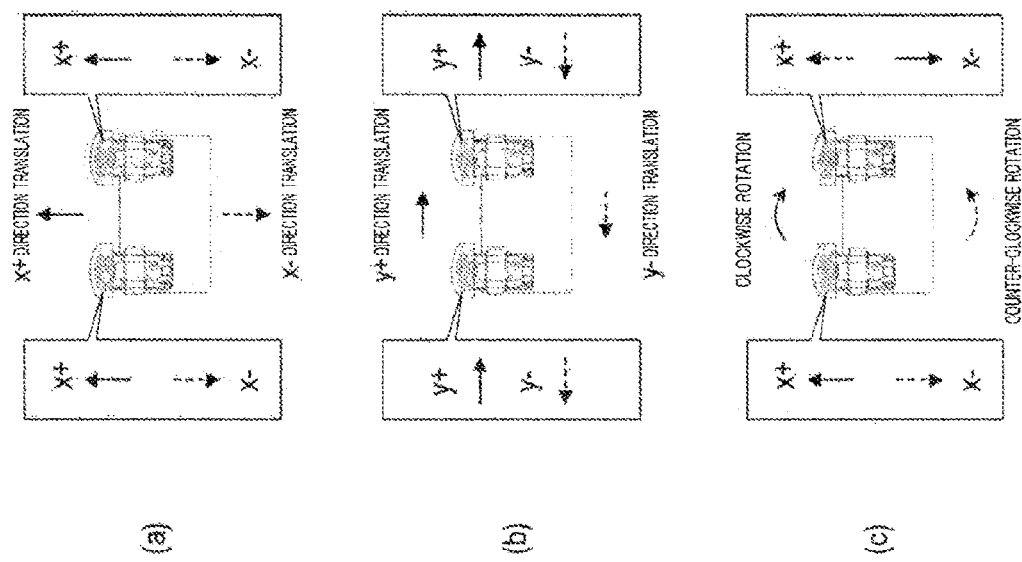
FIG. 8 is a schematic diagram showing variation of directions in which the mock force sensation presenting device in the second embodiment may present mock force sensation.

Next, a description is given of variation of the mock force sensation that may be presented by combination of the two mock force sensation presenting modules 14, with reference to FIG. 8. First, as shown in FIG. 8(a), when both of the two mock force sensation presenting modules 14 present mock force sensation in the x+ or x− direction, the mock force sensation presenting device 2 may present, as a whole, mock force sensation that translates in the x+ or x− direction. Likewise, as shown in FIG. 8(b), when both of the two mock force sensation presenting modules 14 present mock force sensation in the y+ or y− direction, the mock force sensation presenting device 2 may present, as a whole, mock force sensation that translates in the y+ or y− direction. Additionally, as shown in FIG. 8(c), when the left side mock force sensation presenting module 14 presents mock force sensation in the x+ direction, while the right side mock force sensation presenting module 14 presents mock force sensation in the x− direction, the mock force sensation presenting device 1 may present mock force sensation that rotates clockwise (counter-clockwise when viewed from the user operating the information device). Likewise, when the left side mock force sensation presenting module 14 presents mock force sensation in the x− direction, while the right side mock force sensation presenting module 14 presents mock force sensation in the x+ direction, the mock force sensation presenting device 1 may present mock force sensation that rotates counter-clockwise (clockwise when viewed from the user operating the information device).

The mock force sensation presenting device 2 of the above configuration in this embodiment may thus be easily integrated with information equipment (for example, a tablet terminal) and have more degrees of freedom with respect to the directions in which mock force sensation is presented.

Modified Embodiment 1

Figure 9:
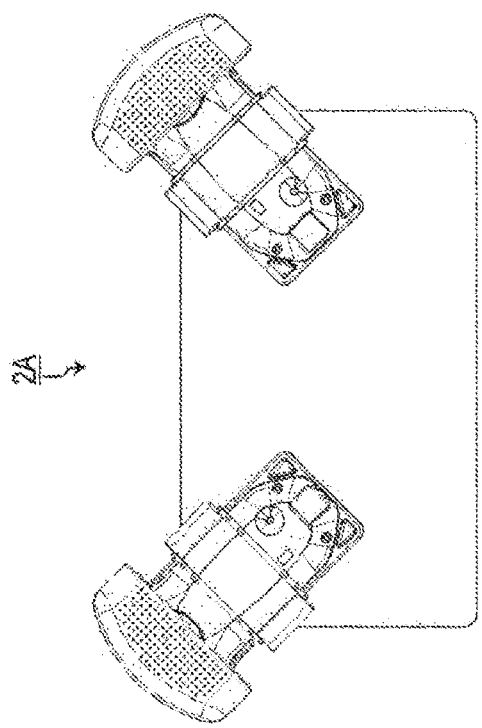
FIG. 9 is a bottom view illustrating a configuration of a mock force sensation presenting device in the modified embodiment 1.

A description is given below of a mock force sensation presenting device in the modified embodiment 1, which is modified from that in the second embodiment, with reference to FIG. 9. As shown in FIG. 9, a mock force sensation presenting device 2A in this modified embodiment is characterized by rotating and fixing the direction of the mock force sensation presenting modules 14 in the second embodiment. In other words, in this modified embodiment, the mock force sensation presenting module 14 disposed on the left side is rotated and fixed so that the direction from the body 141 to the grip 142 is the upper left diagonal and the mock force sensation presenting module 14 disposed on the right side is rotated so that the direction from the body 141 to the grip 142 is the upper right diagonal. With the mock force sensation presenting modules 14 rotated and disposed as described above, mock force sensation may be presented in front, rear, left, and right directions by using two sets of actuators, each having two degrees of freedom, so that more mock force sensation may be presented.

Modified Embodiment 2

The above two mock force sensation presenting modules 14 may be stacked and fixed to a holder of an information device or the like. Stacking the two mock force sensation presenting modules 14 may present force sensation with a total of four degrees of freedom with two degrees of freedom of translation and two degrees of freedom of rotation.

<Supplementary Note>

Although in the above embodiments and modified embodiments, a mock force sensation presenting device including two mock force sensation presenting modules 14 has been disclosed, three or more mock force sensation presenting modules 14 may be included in one device.

The invention claimed is:

1. A pseudo-haptic device, the device comprising:
a case;
a holder formed on the backside of the case;
a plurality of pseudo-haptics inside the holder, wherein each pseudo-haptic of the plurality of pseudo-haptics is configured to generate, based on asymmetric movement of a contact part inside the pseudo-haptic, pseudo-haptic sense at least in a positive direction or a negative direction of one of predetermined two axes; and
an information device inside the case, wherein the information device communicably connects to the plurality of pseudo-haptics for controlling the plurality of pseudo-haptics, and wherein the information device causes the pseudo-haptic device generates a directional pseudo-haptic sense using the plurality of pseudo-haptics.

2. The pseudo-haptic device of claim 1, the device further comprising:
a pair of pseudo-haptics.

3. The pseudo-haptic device of claim 2, the device further comprising:
a grip configured to be gripped by a plurality of fingers on one side in longitudinal directions of the pair of pseudo-haptics.

4. The pseudo-haptic device of claim 3, wherein the grip is fixed to the case, projecting outward from an edge of the case.

5. The pseudo-haptic device of claim 4,
wherein the pair of pseudo-haptics are fixed to the case, wherein longitudinal directions of the pair of pseudo-haptics being disposed in longitudinal directions of the case 180 degrees different in orientation,
wherein a first pseudo-haptic of the pair of pseudo-haptics generates first pseudo-haptic sense at least in a first direction of a first axis of the predetermined two axes,
wherein a second pseudo-haptic of the pair of pseudo-haptics generates second pseudo-haptic sense at least in a second direction of the first axis of the predetermined two axes, wherein the first direction and the second direction are opposite directions; and
wherein the pseudo-haptic device generates, based on the first pseudo-haptic sense and the second pseudo-haptic sense, rotational pseudo-haptic sense.

6. The pseudo-haptic device of claim 4, wherein the longitudinal directions of the pair of pseudo-haptics are fixed to the case, wherein both of the pair of pseudo-haptics being disposed in the same direction in perpendicular to the longitudinal directions of the case,
wherein a first pseudo-haptic of the pair of pseudo-haptics generates first pseudo-haptic sense at least in a first direction of a first axis of the predetermined two axes,
wherein a second pseudo-haptic of the pair of pseudo-haptics generates second pseudo-haptic sense at least in a second direction of the first axis of the predetermined two axes, wherein the first direction and the second direction are opposite directions; and
wherein the pseudo-haptic device generates, based on the first pseudo-haptic sense and the second pseudo-haptic sense, rotational pseudo-haptic sense.

7. The pseudo-haptic device of claim 4,
wherein a first pseudo-haptic of the pair of pseudo-haptics is disposed to the left side of a second pseudo-haptic of the pair of pseudo-haptics based on a view point from the backside of the case,
wherein the first pseudo-haptic is fixed to the case so that a direction from a body of the first pseudo-haptic to the grip is upper-left diagonal based on the view point from the backside of the case, and
wherein the second pseudo-haptic is fixed to the case so that a direction from the body of the second pseudo-haptic to the grip is upper-right diagonal based on the view point from the backside of the case.

8. A method for generating a directional pseudo-haptic sense, the method comprising:
 communicating, by an information device inside a case, a control instruction for controlling a plurality of pseudo-haptics inside a holder on a backside of the case, wherein the information device causes the pseudo-haptic device generates the directional pseudo-haptic sense using the plurality of pseudo-haptics; and
 generating, based on the control instruction causing asymmetric movement of a contact part inside a pseudo-haptic of the plurality of pseudo-haptics, a plurality of pseudo-haptic senses, wherein the plurality of pseudo-haptic senses include one of:
  a positive direction along an axis of predetermined two axes,
  a negative direction along the axis of the predetermined two axes,
  a clock-wise rotation of the case, or
  a counter clock-wise rotation of the case.

9. The computer-implemented method of claim 8, wherein the plurality of pseudo-haptics include a pair of pseudo-haptics, wherein each pseudo-haptic of the pair of pseudo-haptics generates an asymmetric motion using the contact part at least in the positive direction and the negative direction along the axis of the predetermined two axes of movement, causing the directional pseudo-haptic sense.

10. The computer-implemented method of claim 9, the method further comprising:
 interactively receiving, by a grip, gripping from a plurality of fingers on one side in longitudinal directions of the pair of pseudo-haptics.

11. The computer-implemented method of claim 10, wherein the grip is fixed to the case, projecting outward from an edge of the case.

12. The computer-implemented method of claim 11, wherein the pair of pseudo-haptics are fixed to the case, wherein longitudinal directions of the pair of pseudo-haptics being disposed in longitudinal directions of the case 180 degrees different in orientation,
 wherein a first pseudo-haptic of the pair of pseudo-haptics generates first pseudo-haptic sense at least in a first direction of a first axis of the predetermined two axes,
 wherein a second pseudo-haptic of the pair of pseudo-haptics generates second pseudo-haptic sense at least in a second direction of the first axis of the predetermined two axes, wherein the first direction and the second direction are opposite directions; and
 wherein the pseudo-haptic device generates, based on the first pseudo-haptic sense and the second pseudo-haptic sense, rotational pseudo-haptic sense.

13. The computer-implemented method of claim 11, wherein the longitudinal directions of the pair of pseudo-haptics are fixed to the case, and wherein both of the pair of pseudo-haptics being disposed in the same direction in perpendicular to the longitudinal directions of the case,
 wherein a first pseudo-haptic of the pair of pseudo-haptics generates first pseudo-haptic sense at least in a first direction of a first axis of the predetermined two axes,
 wherein a second pseudo-haptic of the pair of pseudo-haptics generates second pseudo-haptic sense at least in a second direction of the first axis of the predetermined two axes, wherein the first direction and the second direction are opposite directions; and
 wherein the pseudo-haptic device generates, based on the first pseudo-haptic sense and the second pseudo-haptic sense, rotational pseudo-haptic sense.

14. The computer-implemented method of claim 11,
 wherein a first pseudo-haptic of the pair of pseudo-haptics is disposed to the left side of a second pseudo-haptic of the pair of pseudo-haptics based on a view point from the backside of the case,
 wherein the first pseudo-haptic is fixed to the case so that a direction from a body of the first pseudo-haptic to the grip is upper-left diagonal based on the view point from the backside of the case, and
 wherein the second pseudo-haptic is fixed to the case so that a direction from the body of the second pseudo-haptic to the grip is upper-right diagonal based on the view point from the backside of the case.

15. A system for controlling pseudo-haptics, the system comprises:
 a processor; and
 a memory storing computer-executable instructions that when executed by the processor cause the system to:
  communicate, by an information device inside a case, a control instruction for controlling a plurality of pseudo-haptics inside a holder on a backside of the case, wherein the information device causes the pseudo-haptic device generates a directional pseudo-haptic sense using the plurality of pseudo-haptics; and
  generate, based on the control instruction causing asymmetric movement of a contact part inside a pseudo-haptic of the plurality of pseudo-haptics, a plurality of pseudo-haptic senses, wherein the plurality of pseudo-haptic senses include one of:
   a positive direction along an axis of predetermined two axes,
   a negative direction along the axis of the predetermined two axes,
   a rotation of the case.

16. The system of claim 15, wherein the plurality of pseudo-haptics include a pair of pseudo-haptics, wherein each pseudo-haptic of the pair of pseudo-haptics generates an asymmetric motion using the contact part at least in the positive direction and the negative direction along an axis of the predetermined two axes of movement, causing the directional pseudo-haptic sense.

17. The system of claim 16, the computer-executable instructions when executed further causing the system to:
 interactively receive, by a grip, gripping from a plurality of fingers on one side in longitudinal directions of the pair of pseudo-haptics.

18. The system of claim 17, wherein the grip is fixed to the case, projecting outward from an edge of the case.

19. The system of claim 18, wherein the pair of pseudo-haptics are fixed to the case, wherein longitudinal directions of the pair of pseudo-haptics being disposed in a longitudinal direction of the case 180 degrees different in orientation,
 wherein a first pseudo-haptic of the pair of pseudo-haptics generates first pseudo-haptic sense at least in a first direction of a first axis of the predetermined two axes,
 wherein a second pseudo-haptic of the pair of pseudo-haptics generates second pseudo-haptic sense at least in a second direction of the first axis of the predetermined two axes, wherein the first direction and the second direction are opposite directions; and
 wherein the pseudo-haptic device generates, based on the first pseudo-haptic sense and the second pseudo-haptic sense, rotational pseudo-haptic sense.

20. The system of claim 18, wherein the longitudinal directions of the pair of pseudo-haptics are fixed to the case, and wherein both of the pair of pseudo-haptics being disposed in the same direction in perpendicular to the longitudinal direction of the case,
  wherein a first pseudo-haptic of the pair of pseudo-haptics generates first pseudo-haptic sense at least in a first direction of a first axis of the predetermined two axes,
  wherein a second pseudo-haptic of the pair of pseudo-haptics generates second pseudo-haptic sense at least in a second direction of the first axis of the predetermined two axes, wherein the first direction and the second direction are opposite directions; and
  wherein the pseudo-haptic device generates, based on the first pseudo-haptic sense and the second pseudo-haptic sense, rotational pseudo-haptic sense.

21. The system of claim 18,
  wherein a first pseudo-haptic of the pair of pseudo-haptics is disposed to the left side of a second pseudo-haptic of the pair of pseudo-haptics based on a view point from the backside of the case,
  wherein the first pseudo-haptic is fixed to the case so that a direction from a body of the first pseudo-haptic to the grip is upper-left diagonal based on the view point from the backside of the case, and
  wherein the second pseudo-haptic is fixed to the case so that a direction from the body of the second pseudo-haptic to the grip is upper-right diagonal based on the view point from the backside of the case.

* * * * *